United States Patent
Tawabini et al.

(10) Patent No.: US 12,201,960 B2
(45) Date of Patent: *Jan. 21, 2025

(54) METHOD FOR MAKING ADSORBENT FLY ASH COMPOSITION

(71) Applicants: KING FAHD UNIVERSITY OF PETROLEUM AND MINERALS, Dhahran (SA); King Abdulaziz City for Science and Technology, Riyadh (SA)

(72) Inventors: Bassam Shafiq Tawabini, Dhahran (SA); Muataz Ali Atieh, Dhahran (SA); Faraj Ahmad Abuilaiwi, Hafr AlBatin (SA); Segun Biodun Adebayo, Dhahran (SA)

(73) Assignees: King Fahd University of Petroleum and Minerals, Dhahran (SA); King Abdulaziz City for Science and Technology, Riyadh (SA)

(*) Notice: Subject to any disclaimer, the term of this patent is extended or adjusted under 35 U.S.C. 154(b) by 834 days.

This patent is subject to a terminal disclaimer.

(21) Appl. No.: 17/399,663

(22) Filed: Aug. 11, 2021

(65) Prior Publication Data

US 2021/0370262 A1    Dec. 2, 2021

Related U.S. Application Data

(60) Continuation of application No. 16/787,691, filed on Feb. 11, 2020, now Pat. No. 11,305,255, which is a
(Continued)

(51) Int. Cl.
*B01J 20/20* (2006.01)
*B01J 20/02* (2006.01)
(Continued)

(52) U.S. Cl.
CPC ............... *B01J 20/20* (2013.01); *B01J 20/02* (2013.01); *B01J 20/0233* (2013.01);
(Continued)

(58) Field of Classification Search
None
See application file for complete search history.

(56) References Cited

U.S. PATENT DOCUMENTS

| 2002/0027105 A1 | 3/2002 | Alper |
| 2009/0111689 A1 | 4/2009 | Burba, III |
| 2010/0176044 A1 | 7/2010 | Domb |

FOREIGN PATENT DOCUMENTS

CN    1538874 A    10/2004

OTHER PUBLICATIONS

Adebayo, "Removal of MTBE from Water using Raw and Chemically Modified Fly Ash—a comparative Study.", Apr. 23, 2014, http://ncupm.com/MS-Thesis-Defense-BiodunAdebayo.
(Continued)

*Primary Examiner* — Kara M Peo
(74) *Attorney, Agent, or Firm* — Oblon, McClelland, Maier & Neustadt, L.L.P.

(57) ABSTRACT

Methods and compositions for the adsorptive removal of methyl tertiary butyl ether (MTBE) from contaminated water sources and systems. The compositions contain carbon fly ash doped with silver nanoparticles at specific mass ratios. Methods of preparing and characterizing the adsorbents are also provided.

7 Claims, 6 Drawing Sheets

Related U.S. Application Data continuation of application No. 15/836,186, filed on Dec. 8, 2017, now Pat. No. 10,596,546, which is a division of application No. 14/473,702, filed on Aug. 29, 2014, now abandoned.

(51) Int. Cl.
*B01J 20/28* (2006.01)
*C02F 1/28* (2023.01)
*C02F 101/34* (2006.01)

(52) U.S. Cl.
CPC ......... *B01J 20/28059* (2013.01); *C02F 1/288* (2013.01); *C02F 1/281* (2013.01); *C02F 1/283* (2013.01); *C02F 2101/34* (2013.01); *C02F 2305/08* (2013.01)

(56) References Cited

OTHER PUBLICATIONS

Emtiazi G, et al., "The enhancement of methyl tertiary butyl ether oxidation by Gordonia in the presence of nanosilver and nitrate" Jundishapur Journal of Microbiology, 2011, vol. 4, Issue 2, Spring, http://jmicrobiol.com/?page=article&article_id=2420.

Openshaw, S. Utilization of Coal Fly Ash. University of Florida. 1992.

Chen, et al. Adsorption of methyl tert butyl ether using granular activated carbon: Equilibrium and kinetic analysis. Int. J. Environ. Sci. Tech. 7(2), 235-242. Spring 2010. College of Biological and Environmental Engineering, Zhejiang University of Technology.

METHOD FOR MAKING ADSORBENT FLY ASH COMPOSITION

CROSS-REFERENCE TO RELATED APPLICATIONS

The present application is a Continuation of U.S. application Ser. No. 16/787,691, pending, having a filing date of Feb. 11, 2020 which is a Continuation of U.S. application Ser. No. 15/836,186, now U.S. Pat. No. 10,596,546, having a filing date of Dec. 8, 2017 which is a Divisional of U.S. application Ser. No. 14/473,702, abandoned, having a filing date of Aug. 29, 2014.

BACKGROUND OF THE INVENTION

Technical Field

The present invention relates to methods and compositions for removal of methyl tertiary butyl ether (MTBE) from contaminated water sources and systems. More particularly, the present invention relates to metal modified carbon fly ash and methods of treating MTBE-contaminated water sources and systems with the modified carbon fly ash.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Methyl tertiary butyl ether (MTBE) is an established contaminant of water sources, following its large scale utilization as gasoline oxygenate, in replacement of tetraethyl lead (Rick C., Barbara R., John Z., (2001). National Survey of MTBE and other VOCs in Community Drinking-Water Sources, U.S. Geological Survey, FS-064-01—incorporated herein by reference in its entirety. Leakage from underground storage tanks, spills during production, transportation and at gasoline filling stations account for the major sources of environmental contamination. The high solubility of about 50,000 mg/L, low organic-carbon partition coefficient $K_{oc}$ (11 mg/L) and poor natural degradation make it persistent in the environment, as it migrates easily in the water system, with little tendency of being confined to the origin of contamination (Squillace P. J., Pope D. A., Price C. V., (1995). Occurrence of the gasoline additive MTBE in shallow ground water in urban and agricultural areas (U.S. Geological Survey Fact Sheet FS-114-95, p. 4—incorporated herein by reference in its entirety) coupled with the unpleasant odor and taste introduced into the contaminated system are the primary concerns associated with MTBE. However, the US Environmental Protection Agency considers MTBE to be a potential human carcinogen, with advisory level for MTBE ranging from 20 to 40 µg/L (U.S. Environmental Protection Agency, (1997b). Drinking Water Advisory: Consumer Acceptability Advice and Health Effects Analysis on Methyl Tertiary-Butyl Ether (MTBE). Washington, D.C.: U.S. Environmental Protection Agency, Office of Water, EPA-822-F-97-009—incorporated herein by reference in its entirety).

Remediation technologies such as adsorption with activated carbon or charcoal filters, air stripping, and ultraviolet/ hydrogen peroxide (Fenton) treatment have recorded varying levels of success with MTBE. However, each technique is characterized by its inherent limitations, which creates the continuous need for improvements in the removal of MTBE from contaminated water sources. Adsorption based treatments of MTBE contaminated systems face a major challenge from the high solubility and low organic-carbon properties of MTBE. However, granular activated carbon has recorded significant success in removal of MTBE from aqueous solution, hence regarded as the established adsorbent of MTBE (Sutherland J., Adams C., Kekobad J., (2004). Treatment of MTBE by air stripping, carbon adsorption, and advanced oxidation: technical and economic comparison for five groundwaters, Water Research, 38(1), pp. 193-205—incorporated herein by reference in its entirety). Impregnation of adsorbent materials with selected metal oxides has been reported to improve their adsorption efficiencies, as several studies have shown for impregnated activated carbon and other low surface area materials like fly ash (Wan Ngah, W. S., and Hanafiah, M. A. K. M. (2008)). Removal of heavy metal ions from wastewater by chemically modified plant wastes as adsorbents: a review. (Bioresource technology, 99(10), 3935-3948—incorporated herein by reference in its entirety). Scientific studies into the use of readily available low cost materials for the removal of environmental contaminants such as heavy metals and other organic pollutants have gained significant attention.

Fly ash (FA) constitutes the major particulate waste by-product during the generation of electricity by burning of coal or heavy liquid fuel. Fly ash is generated as a non-combustible, fine residue, carried in the flue gas and usually collected with the aid of electrostatic precipitators, and having a uniform size distribution of particles ranging 1 to 10 µm (Khairul N. I., Kamarudin H. and Mohd S. I. (2007). Physical, chemical & mineralogical properties of fly ash. Journal of Nuclear and Related Technology 4, 47-51— incorporated herein by reference in its entirety). Presently, the major applications of fly ash are in soil stabilization and as additives in the manufacturing of cements, with a large proportion of the fly ash material being disposed by land filling. The potential for utilizing fly ash as an inexpensive adsorbent was driven by its high alumina and silica content, where it could be adopted as liner for landfills to minimize leachate of organic pollutants (Mott H. V., Weber W. J. (1992). Journal of Environmental Science and Technology, 26, pp 1234—incorporated herein by reference in its entirety).

Application of fly ash as adsorbent of contaminant in aqueous solution is considered to be an alternative form of waste management, in place of the disposal in landfills. Raw fly ash and other modifications to it have been assessed for their removal efficiencies of several environmental contaminants in previous studies (Yadla, S. V., Sridevi, V., & Lakshmi, M. C. (2012). Adsorption performance of fly ash for the removal of lead. International Journal of Engineering Research & Technology, 1(7); Visa, M., & Duta, A. (2013). Methyl-orange and cadmium simultaneous removal using fly ash and photo-Fenton systems. Journal of hazardous materials, 244, 773-779; Ragheb, S. M. (2013). Phosphate removal from aqueous solution using slag and fly ash. HBRC Journal, 9(3), 270-275—each incorporated herein by reference in its entirety). However, their capacity for removal of MTBE from aqueous solution remains unsubstantiated.

In view of the foregoing, it will be advantageous to design methods and compositions that can efficiently treat MTBE contaminated water systems at a low economic cost. Disclosed embodiments of the present invention overcome the shortcomings of the prior art as described herein.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In a first aspect, the present invention relates to adsorption methods for removing methyl tertiary butyl ether (MTBE) from an aqueous solution comprising contacting a composition comprising carbon fly ash and metal nanoparticles with the aqueous solution. The metals can be silver, zinc, copper, nickel, chromium, iron. In a preferred embodiment, the metal is silver. Described methods can efficiently remove at least 10% MTBE from the treated aqueous solution.

The carbon fly ash and the metal nanoparticles are present in the composition at 50-90% and 10-50% by mass, respectively.

The disclosed MTBE adsorption methods are carried out under agitation conditions to provide improved adsorption.

An effective dosage of the composition is in the range of 10 mg to 100 mg per $10^{-3}$ ppb of MTBE.

In a second aspect, the present invention relates to compositions for adsorbing and removing methyl tertiary butyl ether (MTBE) from an aqueous solution comprising carbon fly ash particles and metal nanoparticles. In one embodiment, the carbon fly ash and the metal nanoparticles are present in the composition at 50-90% and 10-50% by mass, respectively. In another embodiment, the preferred metal is silver.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Referring now to the drawings, wherein like reference numerals designate identical or corresponding parts throughout the several views.

The present invention is directed to methods and compositions for removing MTBE from contaminated water sources and systems. Examples of such water sources and systems include, but are not limited to, surface water that collects on the ground or in a stream, aquifer, river, lake, reservoir or ocean, ground water that is obtained by drilling wells, run-off, industrial water, public water storage towers, public recreational pools and bottled water.

In one embodiment, the present invention relates to carbon fly ash based adsorbents for the removal of MTBE. The fly ash may be produced from the combustion of coal, liquid fuels or co-combustion of petroleum coke and coal. The fly ash generated from these combustions may be recovered for recycling by power plants.

Not all fly ash produced from combustions can be used as adsorbents. Fly ash from combustions described above (i.e. carbon fly ash) with a carbon content of at least 65% and having good adsorption properties is suitable for the purposes of the present invention. With carbon as the primary component, other components of carbon fly ash may include oxygen, sulfur, zinc, copper, minerals, metals, main group elements, $SiO_2$, $FeO^{4-}$, $Fe_2O_3$, $Al_2O_3$, CaO, MgO, $CO_2$, $Na_2O$, and/or water. Sources of carbon fly ash include coal power stations, wherein the carbon fly ash is captured from the flue gaseous effluent. Rather than being discarded as wastes into landfills and ash ponds, carbon fly ash wastes may be transported to beneficiation plants for recycling and further processing for secondary uses.

The raw carbon fly ash used in various embodiments of the present invention may have a BET surface area of 1-20 $m^2/g$, preferably 5-10 $m^2/g$ or about 7 $m^2/g$. The particles are generally spherical in shape and range in size from 0.5 μm to 300 μm, preferably no greater than 100 μm or about 50 μm. In a preferred embodiment, carbon fly ash nanoparticles are used to make the MTBE adsorbents in the present invention, have sizes with the ranges of 2500-10000 nm, 5000-8000 nm, preferably 100-2500 nm, or about 1000 nm.

In one embodiment, the raw carbon fly ash may be treated with an acid such as $HNO_3$, HF, HCl and $H_2SO_4$. The acid treatment may enhance the adsorption properties of the carbon fly ash. The raw carbon fly ash may alternately be treated with a base such as NaOH to affect the pore size and/or surface characteristics.

In one embodiment, the raw carbon fly ash may be modified with at least one metal oxide, for example, oxides of silver, zinc, copper, nickel, chromium, iron or any metal of low cost and low toxicity. The modification is for the purpose of increasing the surface area of carbon fly ash in order to increase its MTBE adsorption efficiency. Preferably, carbon fly ash may be impregnated with nanoparticles of a metal oxide wherein the nanoparticles bind to the surface and pore space of the fly ash material.

In one embodiment, the metal oxide is silver oxide (AgO).

In one embodiment, the metal nanoparticles are 1-10 nm in diameter, preferably no greater than 5 nm or about 2 nm.

Also provided are methods of loading the metals onto the raw carbon fly ash. Such methods include direct doping with a stable salt containing the desired metal, wet impregnation, hydrolysis impregnation and chemical vapor deposition (CVD).

In one embodiment, the modification of carbon fly ash with a metal oxide may increase the surface area of the fly ash particles by at least 100% (or at least 15 m$^2$/g), preferably 125-150% (or 15-17.5 m$^2$/g), 150-175% (or 17.5-19 m$^2$/g) or 175-200% (or 19-20 m$^2$/g).

Metal oxide nanoparticles and carbon fly ash are combined at specific mass ratios. In one embodiment, the ratio of the fly ash to metal is 9:1. In another embodiment, the ratio may be 8:2, 7:3, 6:4 or 5:5.

In one embodiment, metal oxide nanoparticles and carbon fly ash are present in the composition at 50-90% and 10-50% by mass, respectively, based on the total weight of the composition.

Methods of removing MTBE according to the present invention include contacting the metal oxide modified carbon fly ash with MTBE-contaminated water sources and systems. These methods may be carried out in tanks, containers or small-scale applications. Before treatment, an exemplary water sample may have MTBE concentrations of $10^{-6}$ to $10^{-1}$ ppb, preferably $10^{-5}$ to $10^{-2}$ ppb or $10^{-3}$ ppb. Effective adsorbent dosages corresponding to the MTBE concentrations may be 0.1 mg to 1 g, preferably 10 mg to 100 mg or 50 mg. MTBE is removed by adsorption, which means the process is physical and no chemical changes, such as oxidation, are made upon MTBE. Contacting is carried out at a convenient temperature lower than the boiling point of MTBE at standard pressure.

The treatment process may run for as long as 30 mins or up to 5 hrs, preferably 1 to 3 hrs or 2 hrs. The duration needs to be long enough to ensure sufficient contact time between adsorbent materials and MTBE compounds. However, if the process is left to run for too long, desorption may start to occur, resulting in the bound MTBE molecules being released from the metal oxide modified carbon fly ash composite particles.

In certain embodiments, the treatment process may be enhanced with mechanical shaking. Agitation speeds of 20-350 rpm, preferably 50-250 rpm or 200 rpm may be introduced to the reaction in order to increase contact between adsorbent and adsorbate (MTBE) materials. At agitation speeds of higher than 350 rpm, adsorbent materials may volatilize.

At least 10% of the total mass of MTBE may be removed by the treatment methods described herein, preferably 20-30% or 25%. It is especially preferred that at least 50%, more preferably at least 60%, 80% or 90% of the MTBE of an MTBE-contaminated sample is removed by adsorption of the MTBE using the treatment methods described herein.

The examples below are intended to further illustrate protocols for preparing and assessing the adsorbent materials for MTBE removal efficiency described herein, and are not intended to limit the scope of the claims.

Example 1

Chemicals

The MTBE used in various embodiments of the present invention was purchased from Sigma-Aldrich, Saudi Arabia, with 99.999% purity (HPLC grade). Deionized water from Mili-Q direct purification system was used for preparation of 100 ppm MTBE stock solutions, from which water was spiked prior to treatment. Silver nitrate (AgNO$_3$) from Eurostar Scientific Company was used as sources of the silver nanoparticles, ethanol from Sigma-Aldrich with 99.8% purity and nitric acid from LOBA Chemic PVT Ltd were also utilized in the embodiments described herein.

Example 2

Preparation of Adsorbent Materials

The fly ash used in this study was obtained from a local power generating plant that has been collected by electrostatic precipitator during the burning of heavy liquid fuel. The raw fly ash was treated with nitric acid in the volume ratio of 1:3 (ash:nitric acid). The mixture was stirred for 24 hrs at 120° C., with an attached condenser. Segregation of phases was ensured by allowing the mixture to stand for 2 hrs, after which the acid was decanted and the slurry phase was washed with deionized water. The washing process was repeated until the pH of the waste water reached the level of that of the original deionized water used. Subsequently, the slurry phase was oven dried at 100° C. for 24 hrs and stored until used for the batch experiments.

A 10% (by mass) silver nanoparticle doping was carried out using silver nitrate (AgNO$_3$) as source. Subsequently, 90% carbon fly ash of total mass was added and soaked in ethanol. Sonication of the mixture was performed for 30 mins, before calcination at 350° C. for 3 hrs (Keith, C. H. (1967). U.S. Pat. No. 3,355,317—incorporated herein by reference in its entirety) and the resultant material stored until used for batch adsorption experiment.

Example 3

Adsorption Experiments

Each of the batch experiments was carried out in a 125 mL conical flask with a Parafilm sealing membrane. For each of the experiments appropriate amount of the adsorbent materials and 100 mL of 1000 ppb initial concentration MTBE spiked solution were added to the conical flask. Blank experiments were conducted to assess the loss of adsorbate to the flask and environment during the sorption process. Different dosages of the adsorbent materials, ranging from 10 mg to 100 mg were used for the sorption tests. A mechanical shaker was used for generating contact in the flask at varied agitation speeds (50 to 200 rpm) and contact time from 1 to 5 hrs. Duplicate 1.0 mL water samples were collected at one hour interval for 5 hrs in a glass vial and analyzed for MTBE concentration using GC/MS system. A gas chromatography coupled with ISQ single quadrupole mass spectrometer system, fitted with a Triplus headspace injector unit and an auto-sampler was used. A fused silica capillary column was used in the unit (60 m length, 0.32 mm internal diameter and 1.80 µm thickness). While the carrier gas was helium at 1.7 mL/min constant flow rate, selected ion monitoring (SIM) mode was used to obtain the ion current at the mass to charge ratio of interest, having set the mass range at 72.50-73.50 for MTBE.

Example 4

Physical and Chemical Characterizations of the Prepared Adsorbents

The results obtained from a variety of relevant instrumental studies of the adsorbent materials, to offer insights into the surface morphology, surface area, elemental composition and mechanism of MTBE removal from the solution, are laid out in the following examples.

Example 5

Thermo-Gravimetric Analysis of the Prepared Adsorbents

Figure 1A:
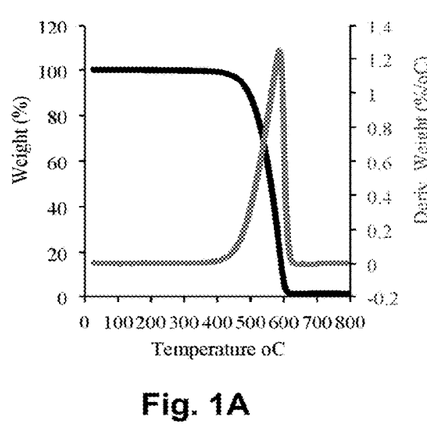
FIG. 1A illustrates the thermo-gravimetric analysis results for 7 mg raw fly ash in alumina pan, at temperature 10° C./min to 800° C. and air as flow gas with a flow rate of 100 mL/min.
Figure 1B:
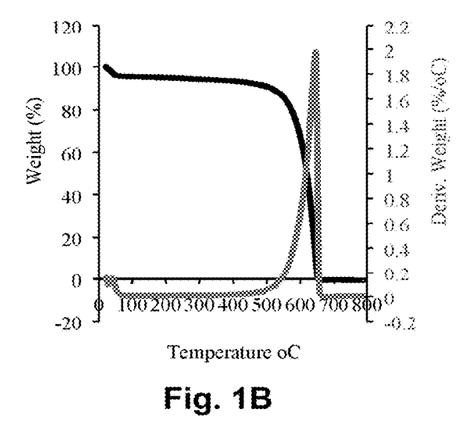
FIG. 1B illustrates the thermo-gravimetric analysis results for 7 mg acid-treated fly ash in alumina pan, at temperature 10° C./min to 800° C. and air as flow gas with a flow rate of 100 mL/min.
Figure 1C:
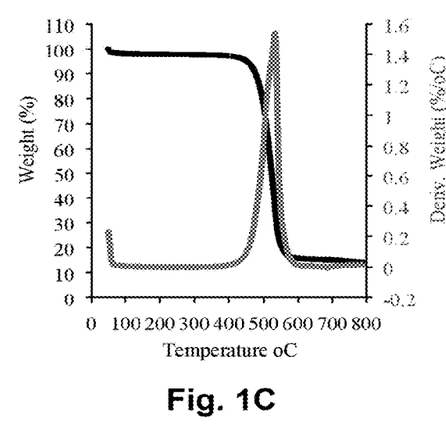
FIG. 1C illustrates the thermo-gravimetric analysis results for 7 mg silver nanoparticles doped fly ash in alumina pan, at temperature 10° C./min to 800° C. and air as flow gas with a flow rate of 100 mL/min.

The results from the thermo-gravimetric analysis (TGA) of the adsorbent materials, as shown in FIG. 1A, show that fly ash was completely burnt at approximately 600° C. with less than 5% impurity remaining beyond this temperature. However, following acid treatment of the fly ash materials, no residual impurity was observed as the residual material's weight dropped to 0%. (see FIG. 1B) For the metal oxide impregnations, 90% (by weight) of fly ash was used in the preparation of the adsorbents, and approximately 80% (by weight) was recovered after calcination as shown in FIG. 1C.

Example 6

Brunauer, Emmett and Teller (BET) Surface Area Analysis of the Prepared Adsorbents BET specific surface areas of the prepared FA based adsorbents were determined by $N_2$ adsorption analysis using a Micromeritics model ASAP 2010 analyzer. Prior to the measurements, the samples were degassed at 250° C. under nitrogen flow for 6 hrs in order to remove moisture completely. Physical adsorption of $N_2$ was carried out in a liquid nitrogen bath maintaining 77 K temperature.

Silver oxide which is the doped silver nanoparticle used in the present invention was for the purpose of increasing the surface area of the carbon fly ash, thereby increasing its MTBE adsorption efficiency. The results BET analysis of the adsorbent materials as summarized in Table 1 showed approximately 100% increase in the surface area of the carbon fly ash following silver oxide impregnation.

TABLE 1

Brunauer Emmett Teller (BET) surface area analysis of FA based adsorbents.

| Adsorbent | BET surface area ($m^2/g$) |
| --- | --- |
| Raw fly ash | 7.1539 |
| Acid treated fly ash | 6.0245 |
| Silver oxide impregnated fly ash | 16.7890 |

Example 7

Figure 2A:
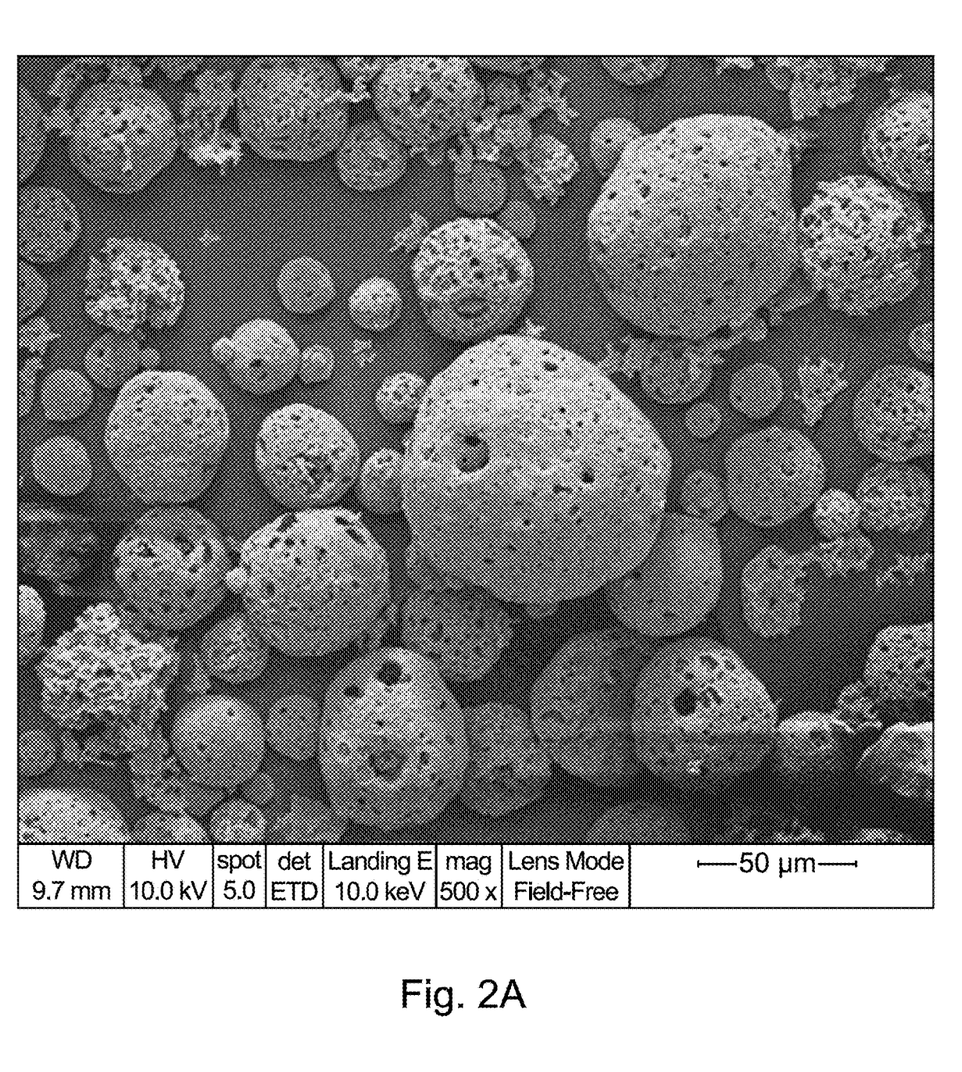
FIG. 2A is an SEM micrograph of carbon fly ash (500× magnification).
Figure 2B:
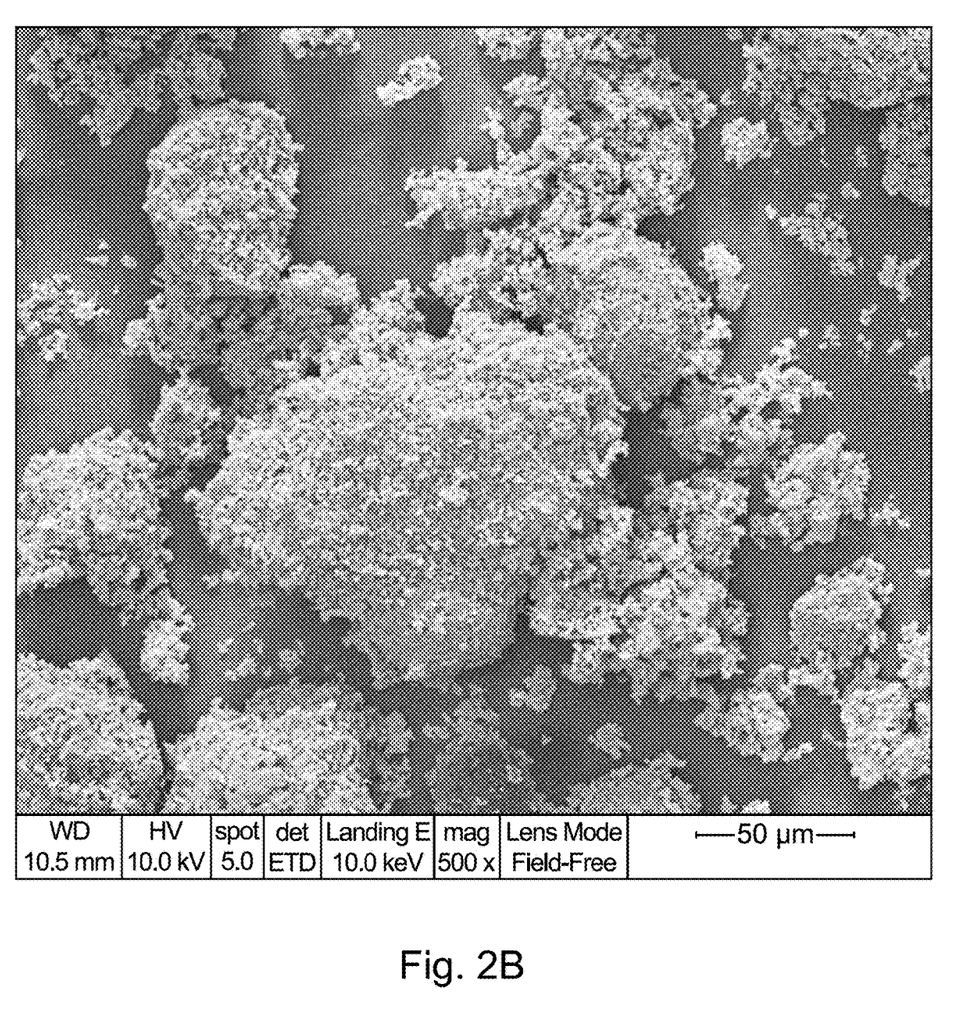
FIG. 2B is an SEM micrograph of silver nanoparticles doped carbon fly ash (500× magnification).

Scanning Electron Microscopy (SEM)-Energy Dispersive X-Ray (EDX) Analysis of the Prepared Adsorbents The SEM micrograph (500× magnification) of the raw fly ash material in FIG. 2A, shows the orbicular structure of the fly ash powder, having approximately 100 μm average grain diameter, with pores of different sizes on its surface. Also, the distribution of the silver nanoparticles on the surface of the fly ash, following impregnation and binding of the metal oxides to the pore spaces on the fly ash material (see FIG. 2B)

Figure 3A:
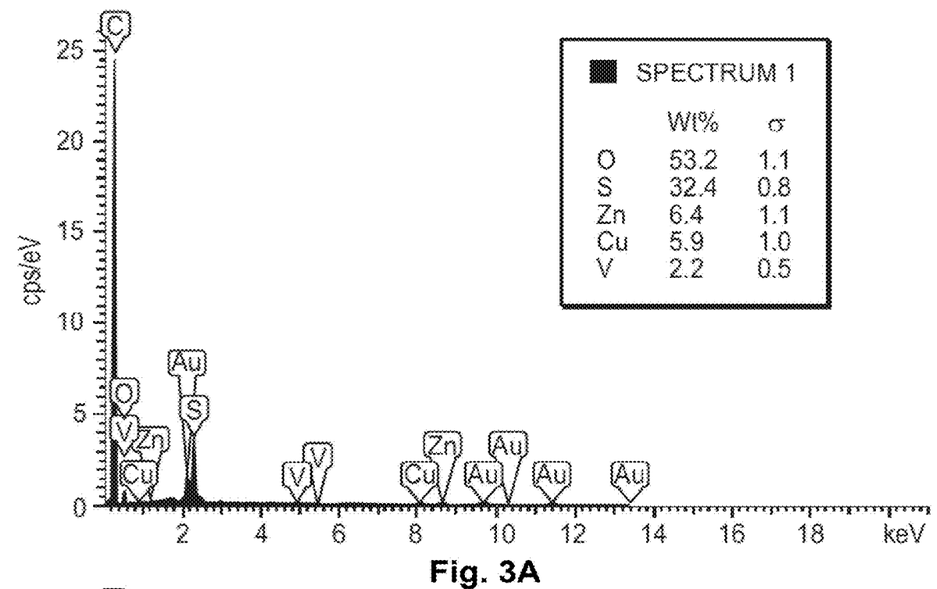
FIG. 3A is an EDX spectrum of carbon fly ash.
Figure 3B:
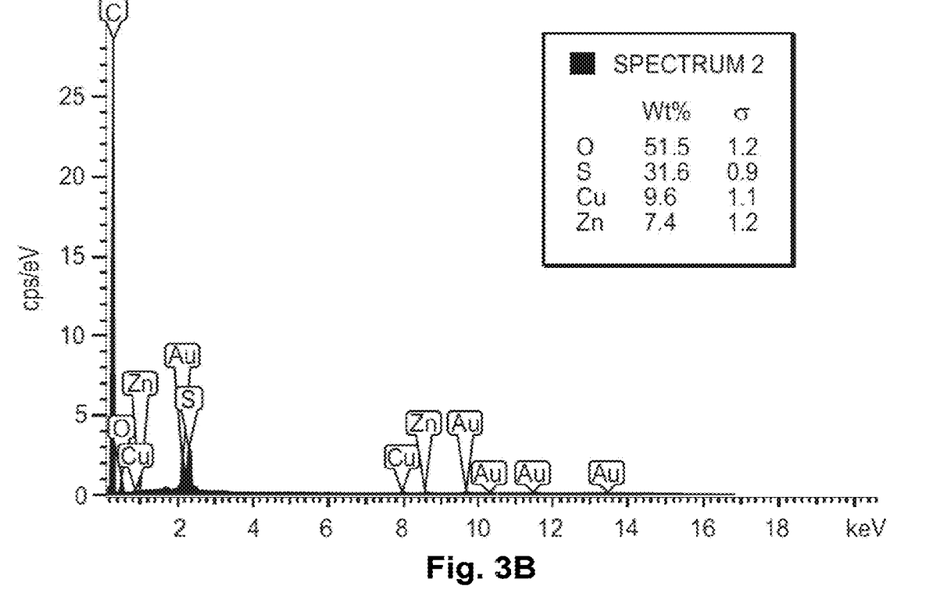
FIG. 3B is an EDX spectrum of acid treated carbon fly ash.
Figure 3C:
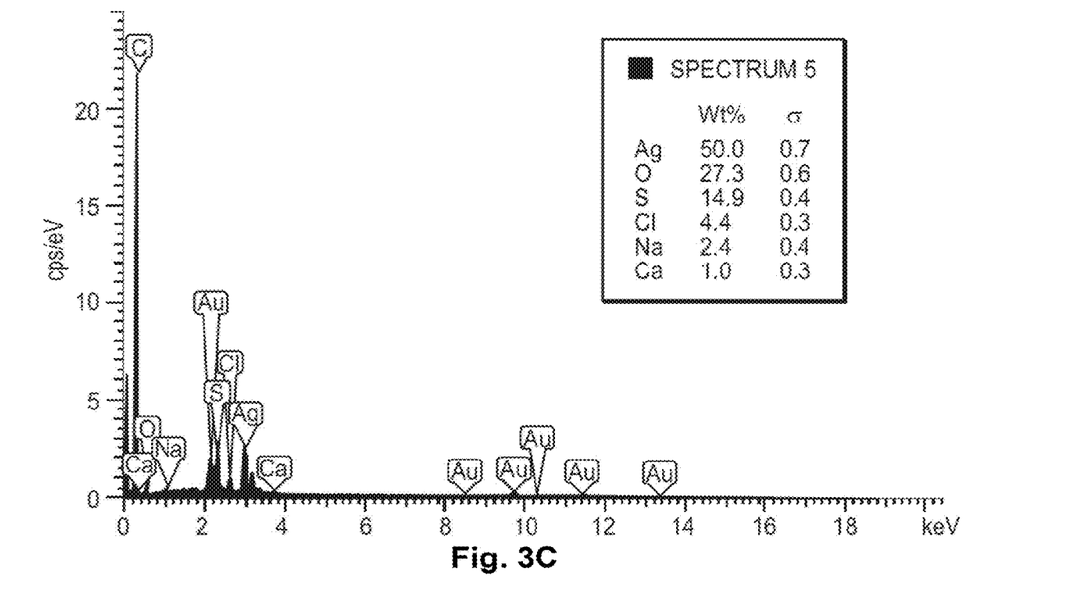
FIG. 3C is an EDX spectrum of silver nanoparticles doped carbon fly ash.

The micro-chemical analysis of raw fly ash material showed the adsorbent to be mainly composed of carbon, with considerable amount of oxygen as shown in the EDX spectra in Table 2, FIGS. 3A, 3B, and 3C. The spectra in FIGS. 3A, 3B, and 3C also showed that acid treatment of the fly ash resulted in removal of vanadium and decrease in sulfur composition of the fly ash material.

TABLE 2

Energy Dispersive X-ray spectroscopy of FA based adsorbents.

| Element | Raw FA | Acid Treated FA Weight % | $Ag_2O$-FA |
| --- | --- | --- | --- |
| Carbon (C) | 78.1 | 80.2 | 76.3 |
| Oxygen (O) | 11.6 | 13.4 | 7.8 |
| Sulfur (S) | 7.1 | 6.4 | 5.3 |
| Zinc (Zn) | 1.4 | — | — |
| Copper (Cu) | 1.3 | — | — |
| Vanadium (V) | 0.5 | — | — |
| Silver (Ag) | — | — | 10.6 |

Example 8

Effects of Treatment Parameters on MTBE Removal

To understand the conditions under which MTBE is removed from the aqueous solution, treatment parameters such as agitation speed, adsorbent dosages and contact time were varied and their impacts on the removal efficiency were noted in the examples described below.

Example 9

Effect of Agitation Speed on MTBE Removal Efficiency

Figure 4:
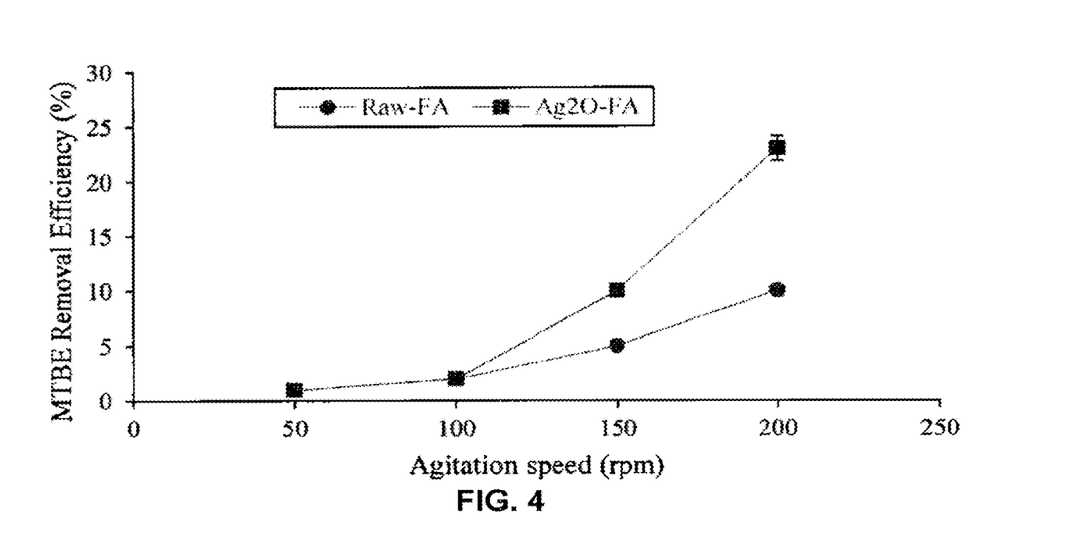
FIG. 4 illustrates the effect of agitation speed on MTBE removal efficiency at room temperature, pH 6, 2 hrs contact time, and 1000 ppb initial MTBE concentration.

Adsorption, being the mechanism of treatment used in this study, required contact between the surface of the adsorbent material and the target adsorbate (MTBE). To understand the role of agitation speed, the batch experiment was conducted at speeds from 50 to 200 rpm. FIG. 4 shows an increase in the removal efficiency with increase in agitation speed till 200 rpm. The poor removal of MTBE at lower agitation speed can be attributed to lack of contact between the active adsorption sites on the fly ash and the MTBE solution, as the adsorbents were settled at the base of the conical flask. However, the speed was not increased beyond 200 rpm in order to minimize loss by volatilization during the agitation process. Hence, subsequent batch experiments were conducted at 200 rpm.

Example 10

Effect of Adsorbent Dosage on MTBE Removal Efficiency

Figure 5:
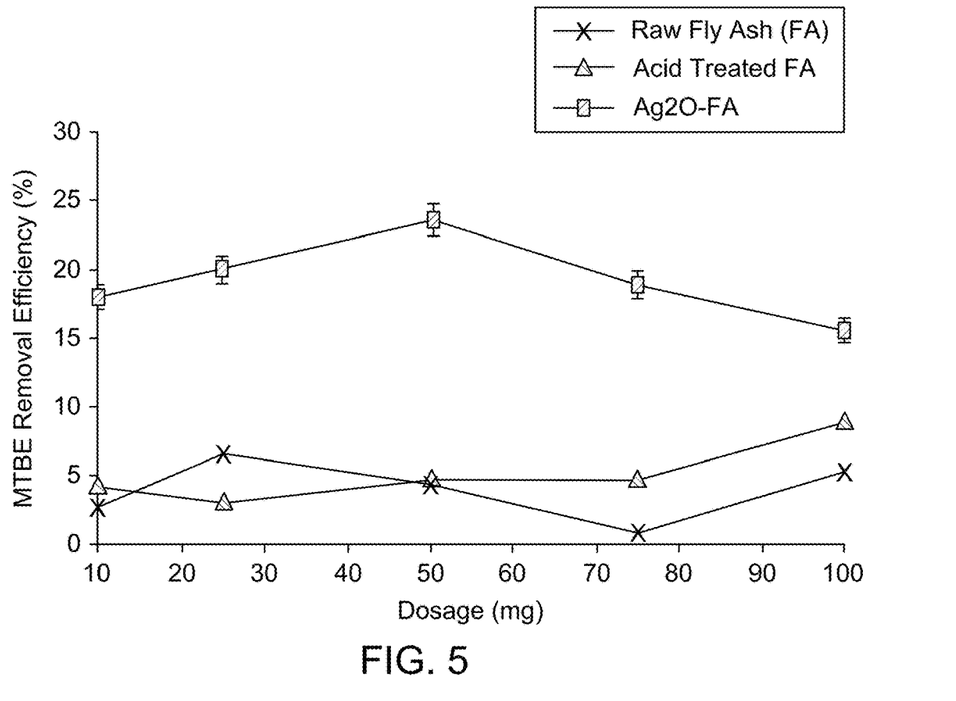
FIG. 5 illustrates the effect of adsorbent dosages (mg) on MTBE adsorption behavior of different fly ash materials at room temperature, 200 rpm, pH 6, 2 hrs contact time, and 1000 ppb initial MTBE concentration.

Several adsorption studies have shown the adsorbent dosage to influence the adsorbate removal efficiencies, because it determines the adsorption capacity of adsorbents based on the number of adsorption sites available (Etim, U. J., Umoren S. A., Eduok U. M. (2012). Coconut coir dust as a low cost adsorbent for the removal of cationic dye from aqueous solution, Journal of Saudi Chemical Society—incorporated herein by reference in its entirety). FIG. 5 shows that with the exception of silver nanoparticles doped carbon fly ash, there was no significant variation in the percentage removal of MTBE for all other fly ash based adsorbent materials tested, with change in dosage. Silver oxide impregnated fly ash showed an increase in adsorption with increase in dosage of adsorbent material until a peak dosage was reached, beyond which a slight decrease in adsorption was observed with increase in adsorbent material. A peak reduction of 24% was noted at 50 mg of adsorbent and further increase in adsorbent resulted in decline in adsorption. The availability of more adsorption sites due to increase in adsorption surface area can be presumed responsible for the increase in MTBE adsorption with increase in adsorbent dosage (SenthilKumar, P., Ramalingam, S., Senthamarai, C., Niranjanaa, M.,Vijayalakshmi, P., Sivanesan, S., (2010). Adsorption of dye from aqueous solution by cashew nut shell: studies on equilibrium isotherm, kinetics and thermodynamics of interactions. Desalination 261, pp. 52-60—incorporated herein by reference in its entirety). The decline in adsorption with increase in dosage beyond 50 mg can be attributed to overlapping or aggregation of adsorption sites resulting in reduction in the surface area available for MTBE adsorption, with El-Sayed et al. reporting similar behavior in an adsorption study of methylene blue (El-Sayed, G. O., (2011). Removal of methylene blue and crystal violet from aqueous solutions by palm kernel fiber. Desalination 272, pp. 225-232—incorporated herein by reference in its entirety).

Example 11

Effect of Contact Time on MTBE Removal Efficiency

Figure 6:
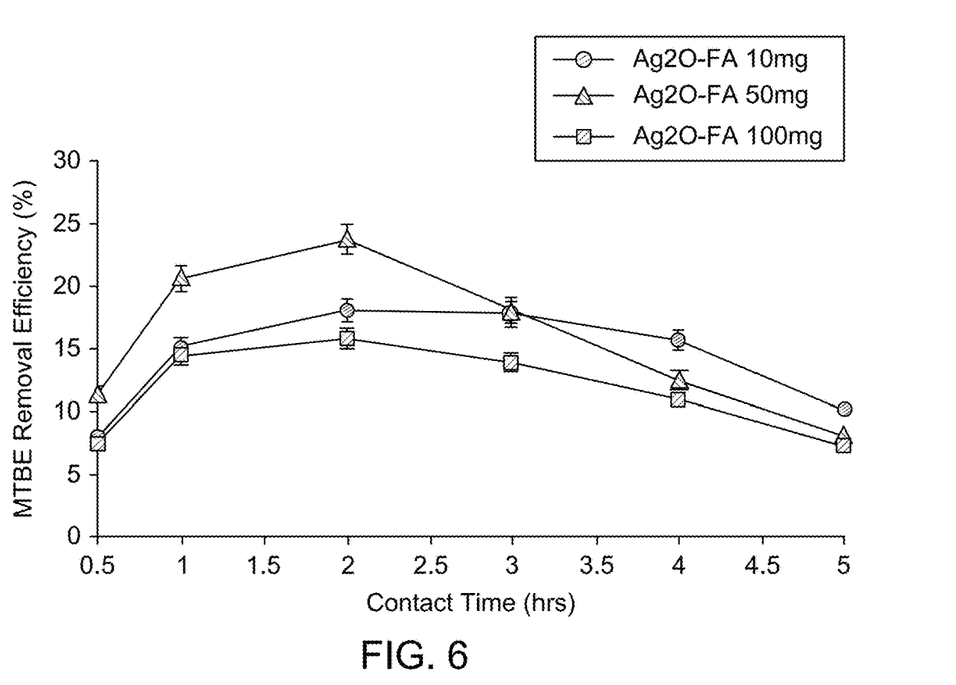
FIG. 6 illustrates the effect of contact time on MTBE adsorption behavior of fly ash based adsorbents at room temperature, 200 rpm, pH 6 and 1000 ppb initial MTBE concentration.

In most adsorption studies, the adsorption time requirements vary based on the nature of interaction occurring between the adsorbent and adsorbate. FIG. 6 shows that the adsorption of MTBE by silver nanoparticles doped carbon fly ash (irrespective of dosage) increased with time till 2 hrs of contact with the adsorbent, after which there was a slight and gradual decline in the adsorption. This observation can be explained by the adsorption equilibrium phenomenon, in which the rate of adsorption was greater than the rate of desorption until equilibrium was reached at the contact time of 2 hrs, at which the adsorption sites on the adsorbent were saturated. Beyond this point, the rate of desorption was greater than the rate of adsorption, accounting for the slight and gradual decline in the MTBE adsorption beyond the optimum time of 2 hrs.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of making a fly ash composition for removing MTBE from an aqueous solution, wherein the fly ash composition comprises:
   acid-treated fly ash particles; and
   silver oxide nanoparticles having diameters in a range of 1-10 nm;
   wherein the acid-treated fly ash particles consist of carbon, oxygen, and sulfur;
   wherein the silver oxide nanoparticles are present on the surface and in pore spaces of the acid-treated fly ash particles;
   wherein the fly ash composition is in the form of particles having sizes in a range of 100 nm to 2.5 μm and has a BET surface area of at least 16.789 m$^2$/g,
   wherein the acid-treated fly ash particles and the silver oxide nanoparticles are present in the fly ash composition at mass percentages of 50-90% and 10-50%, respectively, based on the total weight of the fly ash composition,
   said method comprising:
   first stirring a raw fly ash with nitric acid to form a slurry comprising an acid-treated fly ash;
   segregating an ash-containing phase comprising the acid-treated fly ash from a liquid phase to form a segregated fly ash;
   washing the segregated fly ash to produce the acid-treated fly ash particles;
   mixing the acid-treated fly ash particles with silver nitrate to form silver doped fly ash, then
   calcining the silver doped fly ash to form the fly ash composition.

2. The method of claim 1, wherein the acid-treated fly ash particles consist of 80.2 wt % carbon, 13.4 wt % oxygen, and 6.4 wt % sulfur, each relative to a total weight of the acid-treated fly ash.

3. The method of claim 1, wherein the fly ash composition consists of acid-treated fly ash particles and silver oxide nanoparticles.

4. The method of claim 1, wherein the fly ash composition consists of 76.3 wt % carbon, 7.8 wt % oxygen, 5.3 wt % sulfur, and 10.6 wt % silver oxide nanoparticles, each relative to a total weight of the fly ash composition.

5. The method of claim 1, wherein the silver oxide nanoparticles have diameters in a range of 1-5 nm.

6. The method of claim 1, wherein the silver oxide nanoparticles have diameters in a range of 1-2 nm.

7. The method of claim 1, wherein the raw fly ash has an orbicular structure and a 100 μm average particle diameter.

* * * * *